US010267628B2

(12) United States Patent
Maeda et al.

(10) Patent No.: US 10,267,628 B2
(45) Date of Patent: Apr. 23, 2019

(54) SHEET PROCESSING APPARATUS

(71) Applicant: GLORY LTD., Himeji-shi, Hyogo (JP)

(72) Inventors: Yuki Maeda, Himeji (JP); Akira Hibino, Himeji (JP)

(73) Assignee: GLORY LTD., Himeji-shi, Hyogo (JP)

( * ) Notice: Subject to any disclaimer, the term of this patent is extended or adjusted under 35 U.S.C. 154(b) by 0 days.

(21) Appl. No.: 15/820,523

(22) Filed: Nov. 22, 2017

(65) Prior Publication Data

US 2018/0143015 A1 May 24, 2018

(30) Foreign Application Priority Data

Nov. 24, 2016 (JP) .................................. 2016-227539

(51) Int. Cl.
*B65H 7/06* (2006.01)
*G01B 17/00* (2006.01)
(Continued)

(52) U.S. Cl.
CPC .............. *G01B 17/00* (2013.01); *B65H 7/04* (2013.01); *B65H 7/06* (2013.01); *B65H 43/02* (2013.01);
(Continued)

(58) Field of Classification Search
CPC . G01B 17/00; B65H 7/06; B65H 7/02; B65H 7/14; B65H 29/40
(Continued)

(56) References Cited

U.S. PATENT DOCUMENTS 4,229,650 A * 10/1980 Takahashi .............. B65H 31/10
250/223 R
4,606,535 A * 8/1986 Larson .................. B65H 3/5238
271/10.03
(Continued)

FOREIGN PATENT DOCUMENTS

DE 10 2010 033 993 A1 2/2012
JP 5-213480 A 8/1993
(Continued)

OTHER PUBLICATIONS

European Search Report (Application No. 17203346.6) (8 pages—dated Apr. 26, 2018).

*Primary Examiner* — Thomas A Morrison
(74) *Attorney, Agent, or Firm* — Renner, Kenner, Greive, Bobak, Taylor & Weber

(57) ABSTRACT

One object is to detect a sheet with high precision by using ultrasonic waves. A sheet processing apparatus detects a paper sheet based on a change in ultrasonic waves. The sheet processing apparatus includes a support member that supports a sheet. A through part is formed in the support member. The sheet processing apparatus further includes a transmitting unit that transmits ultrasonic waves from a transmitting surface; a reflecting unit that reflects the ultrasonic waves, which were transmitted from the transmitting unit and passed through the through part; and a receiving unit that receives on a receiving surface the ultrasonic waves reflected by the reflecting unit. The receiving surface faces downward, and the transmitting surface is parallel to a vertical direction or faces downward, or the transmitting surface faces downward, and the receiving surface is parallel to a vertical direction or faces downward.

13 Claims, 13 Drawing Sheets

(51) Int. Cl.
*G01B 11/06* (2006.01)
*B65H 43/02* (2006.01)
*B65H 7/04* (2006.01)

(52) U.S. Cl.
CPC .......... *G01B 11/06* (2013.01); *B65H 2553/30* (2013.01); *B65H 2701/1912* (2013.01)

(58) Field of Classification Search
USPC .......... 271/315, 314; 194/206, 207; 209/534
See application file for complete search history.

(56) References Cited

U.S. PATENT DOCUMENTS

| | | | | |
|---|---|---|---|---|
| 5,004,928 A | * | 4/1991 | Suzuki | B41J 29/00 250/559.16 |
| 5,565,627 A | * | 10/1996 | Dorr | B65H 23/0204 73/159 |
| 5,583,828 A | * | 12/1996 | Arai | B65H 23/0204 226/45 |
| 6,283,471 B1 | * | 9/2001 | Kunzel | B65H 7/06 271/227 |
| 7,654,525 B2 | * | 2/2010 | Wang | B65H 5/38 250/239 |
| 2008/0036138 A1 | * | 2/2008 | Wang | B65H 5/38 271/255 |
| 2008/0203654 A1 | | 8/2008 | Chujo et al. | |
| 2014/0367401 A1 | * | 12/2014 | Stralin | A47K 10/22 221/6 |
| 2016/0114994 A1 | * | 4/2016 | Fukusaka | G03G 15/703 271/3.15 |
| 2016/0159597 A1 | * | 6/2016 | Hayashi | B65H 7/04 271/265.04 |

FOREIGN PATENT DOCUMENTS

| | | | |
|---|---|---|---|
| JP | 3010662 U | | 5/1995 |
| JP | 2009-28959 | * | 2/2009 |
| JP | 2012-128119 A | | 7/2012 |

* cited by examiner

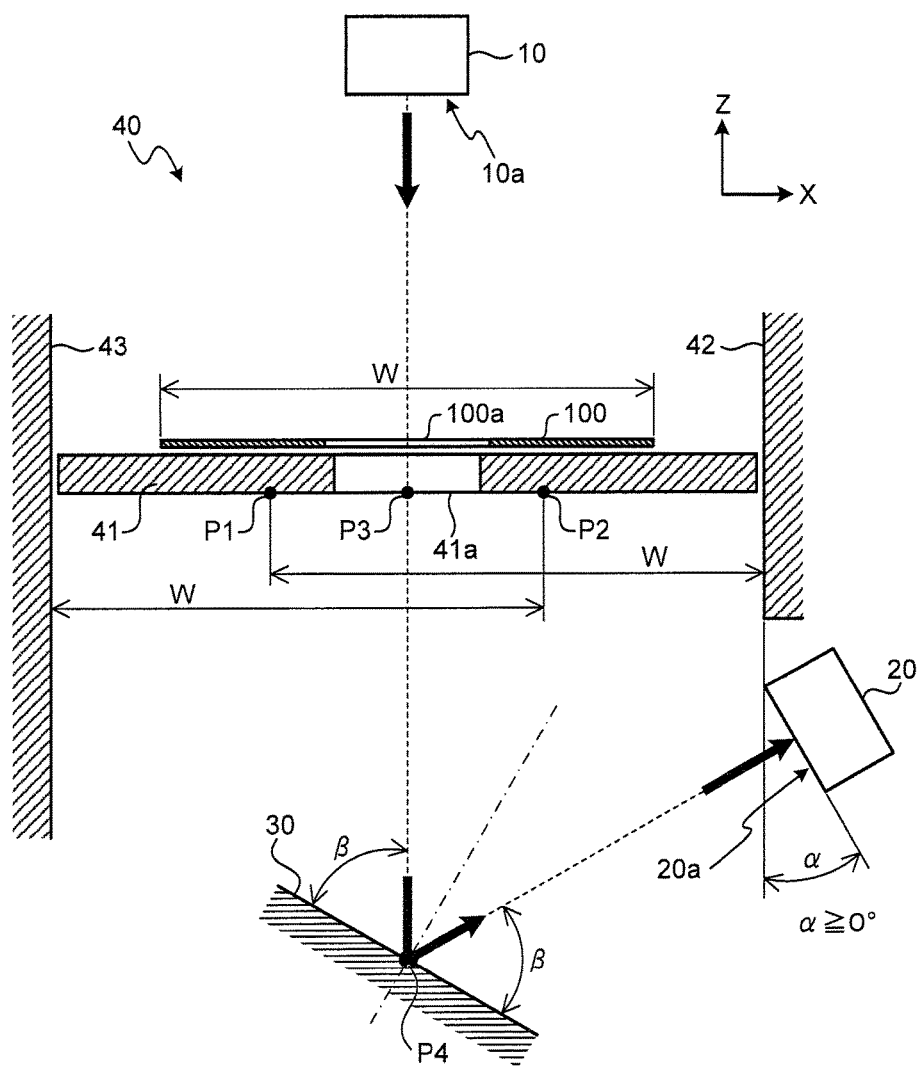

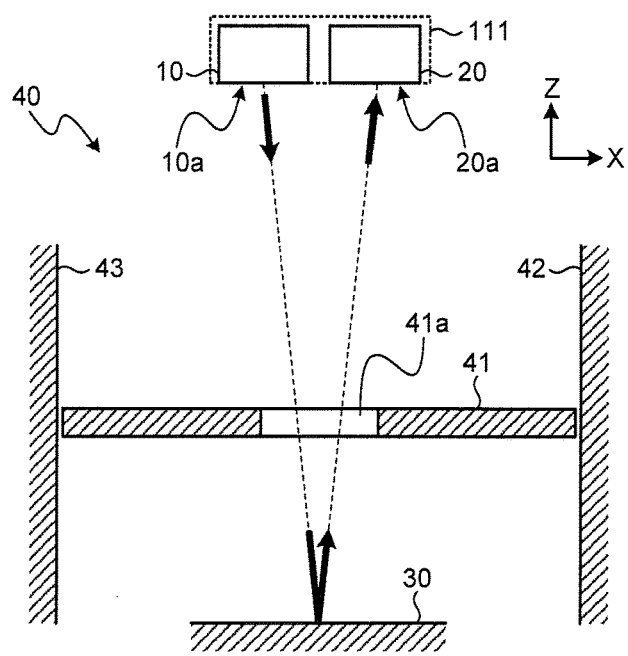
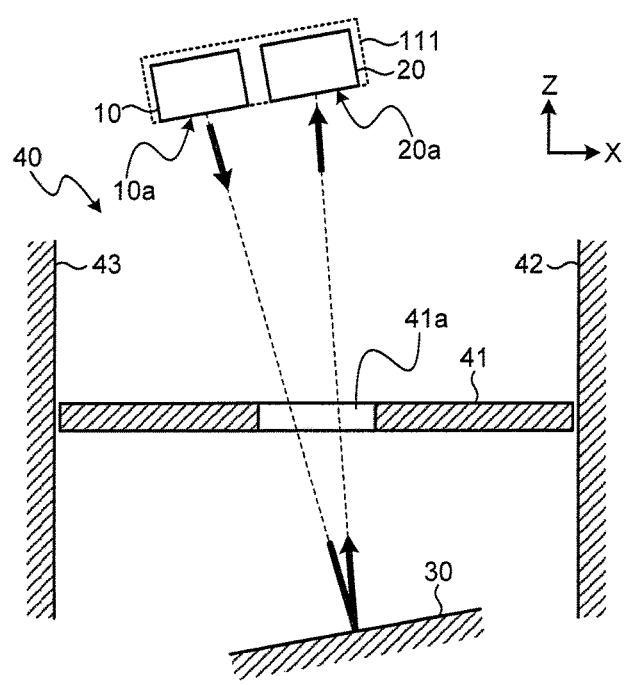

SHEET PROCESSING APPARATUS

BACKGROUND OF THE INVENTION

1. Field of the Invention

The present invention relates to a sheet processing apparatus capable of detecting a sheet by using ultrasonic waves.

2. Description of the Related Art

Conventionally, in a paper sheet handling apparatus that performs recognition and counting of paper sheets, an optical sensor is used to detect a paper sheet transported by a transport unit and a paper sheet stored in a storing unit. The optical sensor includes a light source and a light receiving unit that receives a detection light output from the light source. The light source and the light receiving unit are arranged such that the detection light is blocked when a paper sheet is detected. Accordingly, a paper sheet can be detected based on whether a detection light is received by the light receiving unit.

Some paper sheets have a transparent region made of resin and the like. Because the detection light passes through such a transparent region, the paper sheet cannot be detected by using the detection light. To detect a paper sheet having a partial transparent region, an ultrasonic sensor that uses ultrasonic waves instead of a detection light can be used.

For example, Japanese Patent No. 4812114 and Japanese Patent Application Laid-open No. H5-213480 disclose an apparatus capable of detecting a paper sheet by using a transmitting unit that transmits (outputs) ultrasonic waves and a receiving unit that receives the ultrasonic waves transmitted by the transmitting unit. The transmitting unit and the receiving unit are arranged opposing each other. When a paper sheet is present between the transmitting unit and the receiving unit, the transmitted ultrasonic waves are blocked by the paper sheet so that weak ultrasonic waves are received by the receiving unit. While the detection light passes through a transparent region, the ultrasonic waves become weak when passed though the transparent region. By replacing the light source and the light receiving unit of the optical sensor with the transmitting unit and the receiving unit of the ultrasonic sensor, a paper sheet having a transparent region can be detected based on a reception state of the ultrasonic waves in the receiving unit.

An apparatus that detects a paper sheet by measuring a distance by an ultrasonic sensor is also known in the art. By transmitting the ultrasonic waves from the ultrasonic sensor toward an object, a distance to the object can be measured based on a time duration required to receive the ultrasonic waves reflected from the object. For example, Japanese utility model No. 3010662 discloses an apparatus that detects a banknote bundle stored in a storing unit based on a distance measured by the ultrasonic waves. A banknote bundle is formed by bundling a predetermined number of banknotes. In this apparatus, the ultrasonic waves are transmitted from an ultrasonic sensor arranged above the storing unit toward a bottom surface of the storing unit to measure the distance. When the banknote bundles have been stored in the storing unit in a stacked manner, the distance measured by the ultrasonic sensor changes depending on a height of the stacked banknote bundles. The banknote bundles present in the storing unit are detected based on the change in the measured distance.

However, the detection result of the paper sheet obtained with the conventional ultrasonic sensor is not always correct. For example, when the transmitting unit and the receiving unit of the ultrasonic sensor are arranged opposing to each other on a top surface and on a bottom surface of a paper sheet storing unit, dust and/or trash on a surface of the sensor arranged on the bottom surface can lead to wrong detection. In some banknote handling apparatuses that stacks banknotes in a stacking unit after recognizing and counting the banknotes, the stacking unit is provided with an opening for removing the stacked banknotes. Dust and/or trash can enter into the stacking unit from this opening, and it leads to wrong detection. Even in the apparatus like the one disclosed in Japanese utility model No. 3010662 in which the ultrasonic sensor is arranged on the top surface of the stacking unit and the ultrasonic waves are transmitted toward the bottom surface, and the banknote is detected based on the detected distance, trash and/or dust accumulated on the bottom surface can be wrongly detected as a banknote.

SUMMARY OF THE INVENTION

The present invention is made to address the problems in the conventional technology. It is one object of the present invention to provide a sheet processing apparatus that can detect a sheet with high precision by using ultrasonic waves.

To solve the above problems and to achieve the above object, a sheet processing apparatus according to one aspect of the present invention includes a support member that supports a sheet, a through part being formed in the support member; a transmitting unit that transmits ultrasonic waves from a transmitting surface; a reflecting unit that reflects the ultrasonic waves transmitted from the transmitting unit and passed through the through part; and a receiving unit that receives on a receiving surface the ultrasonic waves reflected by the reflecting unit. The receiving surface faces downward, and the transmitting surface is parallel to a vertical direction or faces downward, or the transmitting surface faces downward, and the receiving surface is parallel to a vertical direction or faces downward.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 2 is a schematic cross-sectional view for explaining a configuration of the banknote detection apparatus.

FIGS. 7A and 7B are schematic cross-sectional views of another example of the banknote detection apparatus that uses a reflection-type ultrasonic sensor.

EMBODIMENTS

Exemplary embodiments of a sheet processing apparatus according to the present invention are explained in detail below with reference to the accompanying drawings. The sheet processing apparatus includes a sheet detection apparatus. The sheet processing apparatus can detect, by using the sheet detection apparatus, the presence or absence of a sheet in a storing unit, a transport path, and the like of the sheet processing apparatus; however, an explanation of a detection method of the sheet in the storing unit will be mainly given in the present embodiment. The type of the sheet as a target of detection by the sheet detection apparatus is not particularly limited; however, an explanation will be given below by taking a banknote as the target of detection by a paper sheet detection apparatus in the present embodiment.

Figure 1A:
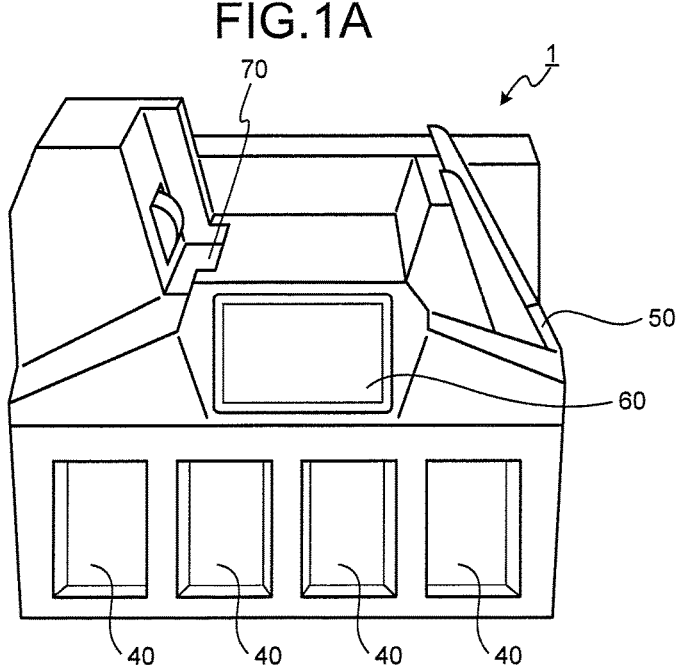
FIGS. 1A and 1B are views for explaining a structure of a banknote handling apparatus including a banknote detection apparatus.
Figure 1B:
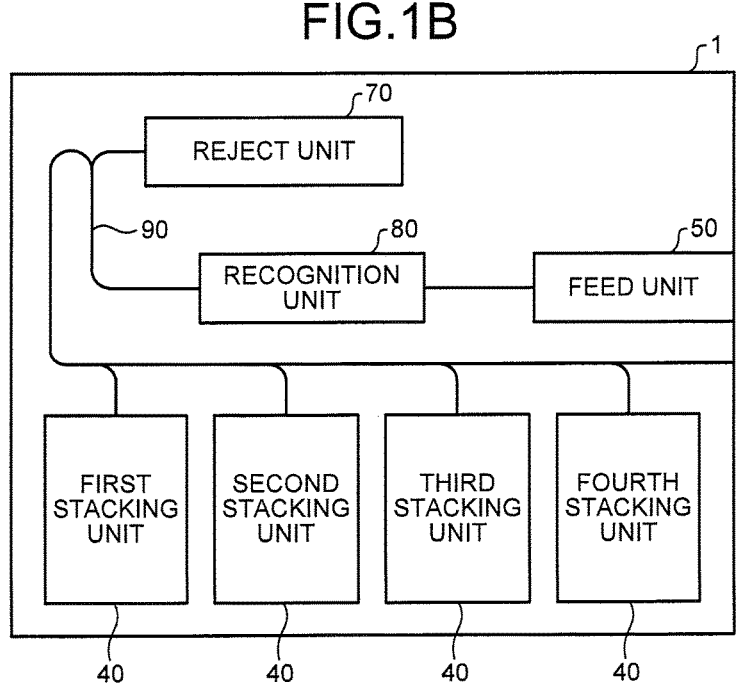

At first, an explanation will be given about a banknote handling apparatus (sheet handling apparatus) in which a banknote detection apparatus (paper sheet detection apparatus) is arranged inside a storing unit. FIGS. 1A and 1B are views for explaining a structure of a banknote handling apparatus 1 including the banknote detection apparatus. FIG. 1A is a schematic external view of the banknote handling apparatus 1 when seen from the front side. FIG. 1B is a schematic block diagram of an internal structure of the banknote handling apparatus 1. The banknote handling apparatus 1 includes four stacking units (storing units) 40 for storing banknotes in a stacked manner. A banknote detection apparatus is arranged inside each of the stacking units 40. Each of the stacking units 40 is provided with an opening on a front surface side of the apparatus for removing the banknotes stacked inside the stacking unit 40.

As shown in FIG. 1A, the banknote handling apparatus 1 includes a feed unit 50, an operation/display unit 60, a reject unit 70, and the stacking units 40. The operation/display unit 60, for example, is constituted by a touch-screen liquid crystal display device. The operation/display unit 60 displays one or more buttons on a screen thereof and functions as an operation unit by accepting input of various information by operation of the button. For example, when an instruction to perform banknote handling is given by operation of the operation/display unit 60, the banknotes placed in the feed unit 50 are taken inside the apparatus one by one and recognized, and the banknotes are sorted and stacked in the four stacking units 40 based on the recognition result of each banknote. Moreover, the operation/display unit 60 functions as a display unit that displays on a screen thereof various setting information and various other information such as denomination, number, amount, and the like of the banknotes stacked in the stacking units 40.

An operator operates the operation/display unit 60 to perform the banknote handling and places the handling target banknotes in the feed unit 50. The feed unit 50 takes the banknotes, which have been placed therein by the operator, inside the apparatus one by one. For example, a reject banknote, such as a banknote that could not be recognized by the banknote handling apparatus 1, is stacked in the reject unit 70, and a banknote that could be recognized is stacked in the stacking unit 40. The operator can remove the banknotes stacked in the stacking unit 40 from the opening of the stacking unit 40.

As shown in FIG. 1B, the feed unit 50, the reject unit 70, the stacking units 40, and a recognition unit 80 are connected by a transport unit 90. The recognition unit 80 includes a plurality of sensors such as a line sensor that acquire an image of the banknote, a thickness detection sensor that detects a thickness of the banknote, and a magnetism detection sensor that detects magnetic characteristics of the banknote. The recognition unit 80 recognizes the banknote based on optical characteristics, the magnetic characteristics, the thickness, and the like of the banknote obtained by these sensors. The recognition unit 80 recognizes denomination, authenticity, fitness, direction (face side up/back side up and portrait normal/portrait reverse), and the like of each banknote taken in by the feed unit 50 and transported by the transport unit 90. The banknote transported by the transport unit 90 is passed through the recognition unit 80 and then stacked either in the reject unit 70 or in one of the stacking units 40 based on the recognition result obtained by the recognition unit 80.

The banknote detection apparatus arranged in each of the stacking units 40 is explained below. Because the banknote detection apparatus having the same configuration is arranged in each of the stacking units 40, only one stacking unit 40 will be explained below.

FIG. 2 is a schematic cross-sectional view for explaining a configuration of the banknote detection apparatus. FIG. 2 is a view when a part inside the stacking unit 40 of the banknote handling apparatus 1 shown in FIG. 1A is seen from the opening on the front surface side of the apparatus. In FIG. 2, X axis represents the horizontal direction corresponding to the left-right direction of the banknote handling apparatus 1, Z axis represents the vertical direction, and Y axis (see FIG. 3) represents the horizontal direction corresponding to the front-back direction of the banknote handling apparatus 1.

As shown in FIG. 2, the banknote detection apparatus is arranged inside the stacking unit 40 that includes a right wall 42, a left wall 43, and a stage 41 for stacking a banknote 100. The banknote detection apparatus includes a transmitting unit 10 for transmitting ultrasonic waves, a reflecting unit 30 for reflecting the ultrasonic waves transmitted by the transmitting unit 10, and a receiving unit 20 for receiving the ultrasonic waves reflected by the reflecting unit 30. The banknote detection apparatus performs transmission and reception of the ultrasonic waves via a through part 41a formed in the stage 41. The stage 41 functions as a support member that supports from below the banknote 100 stacked in the stacking unit 40.

Although not shown in FIG. 2, the banknote 100 recognized by the recognition unit 80 is transported by the transport unit 90 and sent to the stacking unit 40 from above the stage 41. The banknote 100 sent to the stacking unit 40 is stacked on the stage 41, which is like a thin plate, between the right wall 42 and left wall 43.

The stacking unit 40, which has the opening on the front surface side of the apparatus, has a side wall (back wall) on the back surface side of the apparatus. Movements of left edge, right edge, and back edge of the banknote 100 sent to the stacking unit 40 are regulated by the three side walls, i.e., the right wall 42, the left wall 43, and the back wall, and the banknote is stacked on the stage 41 such that a banknote face thereof sits on a top surface of the stage 41.

The stage 41 can be fixed inside the stacking unit 40. Alternatively, the stage 41 can move in an up-down direction (Z-axis direction) inside the stacking unit 40 depending on the number of the banknotes 100 stacked on the top surface of the stage 41. For example, the movement of the stage 41 can be automatically achieved by machine controlling a position of the stage 41, which is movable in the up-down direction, depending on the number of the stacked banknotes. Alternatively, for example, the stage 41, which is movable in the up-down direction, can be held at a predetermined height by using an elastic member, such as a spring, such that the stage 41 moves down because of the weight of the stacked banknotes and the stage 41 returns to its original position when the stacked banknotes are removed.

As shown in FIG. 2, the stage 41 is provided with the through part 41a for passing the ultrasonic waves through the stage 41 from the top surface side to a bottom surface side of the stage 41. The through part 41a is formed in the stage 41 at such a position that, irrespective of where the banknote 100 is stacked in the left-right direction (X-axis direction) of the apparatus, the through part 41a shall be blocked by the stacked banknote 100. Specifically, assume that a width in the left-right direction (X-axis direction) of the banknote 100, that is, a width of the short edge is w (mm). Then, as shown in FIG. 2, the through part 41a is formed within a range defined between a position P1 and a position P2. The position P1 is a position of a left edge of the banknote 100 when the banknote 100 is stacked such that a right edge thereof is touching the right wall 42 of the stacking unit 40. The position P2 is a position of the right edge of the banknote 100 when the banknote 100 is stacked such that the left edge thereof is touching the left wall 43 of the stacking unit 40. Moreover, the through part 41a is formed such that it contains a position P3 from where the ultrasonic waves transmitted and received between the transmitting unit 10 and the receiving unit 20 pass.

Figure 3A:
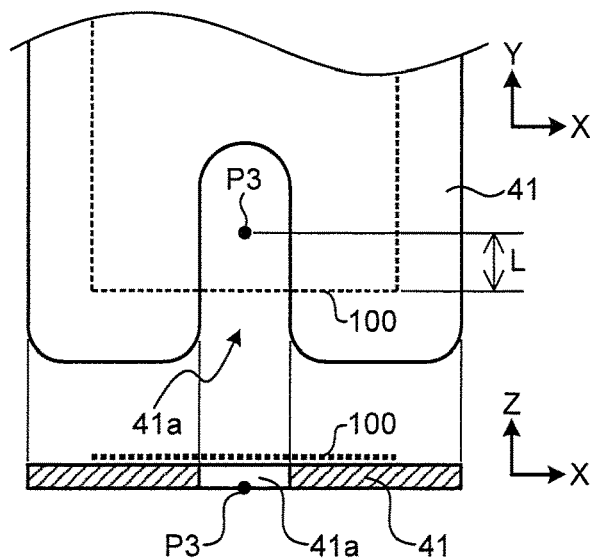
FIGS. 3A and 3B are views for explaining a shape of a through part.
Figure 3B:
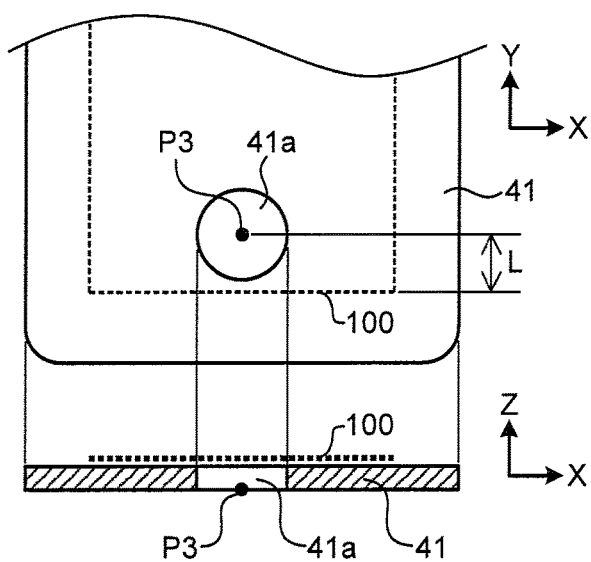

FIGS. 3A and 3B are views for explaining a shape of the through part 41a. In an upper part of each of FIGS. 3A and 3B is shown a view of a partial region on a front surface side of the stage 41 when seen from above, and in a lower part of each of FIGS. 3A and 33 is shown a view of a cross section passing through the position P3 when seen from the front surface side. The banknote 100 stacked on the stage 41, with the back edge of the banknote 100 touching the back wall of the stacking unit 40, is shown with a dotted line.

For example, as shown in FIG. 3A, the through part 41a is formed by cutting the stage 41 from the front surface side. A cutout portion is formed in the front surface side of the stage 41. This cutout portion makes it easy to grasp the stacked banknote 100 from above and below when inserting the hand from the opening on the front surface of the stacking unit 40 and removing the banknote 100 that has been stacked on the stage 41. This cutout portion is used as the through part 41a for passing the ultrasonic waves.

Alternatively, as shown in FIG. 3B, for example, a through-hole passing from the top surface to the bottom surface of the stage 41 can be formed as the through part 41a. A shape of the through-hole is not limited. The through-hole, other than being circular, as shown in FIG. 3B, can be oval, elongated, rectangular, polygonal, and the like.

The position P3 has been shown schematically shown in FIGS. 3A and 3B. The position P3 is the position through which the ultrasonic waves pass. The ultrasonic waves are transmitted and received between the transmitting unit 10 and the receiving unit 20. The position P3 is a position that is blocked by the stacked banknote 100 irrespective of the position where the banknote 100 is stacked in the front-back direction (Y-axis direction) on the stage 41. Specifically, when the banknote 100 is stacked such that the back edge of the banknote 100 is touching the back wall of the stacking unit 40, as shown in FIGS. 3A and 3B, the position P3 through which the ultrasonic waves pass is a position that is at a predetermined distance L (mm) toward the back surface side from the front edge of the banknote 100. To allow distinguishing between when the banknote 100 is on the stage 41 and when the banknote 100 is not on the stage 41 from a change in the ultrasonic waves received by the receiving unit 20, the distance L is suitably determined based on a diameter of the ultrasonic sensor constituted by the transmitting unit 10 and the receiving unit 20, characteristics of the ultrasonic wave transmitted by the transmitting unit 10, and the like.

The through part 41a is arranged at such a position that at least a part of the ultrasonic waves that pass through the through part 41a is blocked by the banknote 100 irrespective of the stacked position of the banknote 100 stacked on the stage 41. Moreover, the through part 41a is arranged at such a position that at least a part of the ultrasonic waves that pass through the through part 41a is blocked by the banknotes 100 irrespective of the size of the banknotes 100 when the banknotes 100 of various types having different sizes are stacked on the stage 41. That is, the through part 41a is arranged at such a position that the ultrasonic waves that pass through the through part 41a and received by the receiving unit 20 change irrespective of which type of the banknotes is stacked at which position on the stage 41 among the banknotes that are the handling target in the banknote handling apparatus 1.

The transmitting unit 10 transmits the ultrasonic waves having a straightness. As shown in FIG. 2, the transmitting unit 10 is arranged above the stage 41 so that it is not in the way of the banknote transported by the transport unit 90 to the stacking unit 40.

The transmitting unit 10 is arranged such that a transmitting surface 10a for transmitting the ultrasonic waves faces downward and the ultrasonic waves transmitted from the transmitting surface 10a pass through the position P3. Specifically, the transmitting unit 10 is arranged such that the circular transmitting surface 10a, for example, is parallel to the XY plane, and a straight line that joins a center of the transmitting surface 10a and the position P3 is parallel to the Z-axis direction.

The transmitting unit 10 transmits the ultrasonic waves downward toward the stage 41 and the reflecting unit 30. For example, the transmitting unit 10 transmits the ultrasonic waves downward in the Z-axis direction. If no banknote 100 has been stacked on the stage 41, the ultrasonic waves transmitted by the transmitting unit 10 reach the reflecting unit 30 after passing through the through part 41a.

The reflecting unit 30 reflects the ultrasonic waves transmitted by the transmitting unit 10 and passed through the through part 41a. For example, a part of a bottom surface of the stacking unit 40 can be formed as, as shown in FIG. 2, a surface inclined with respect to the XY plane, and this surface can be used as the reflecting unit 30. However, the configuration of the reflecting unit 30 is not particularly limited as far as the ultrasonic waves received from the transmitting unit 10 can be reflected toward the receiving unit 20. For example, it is allowable to provide the reflecting unit 30 independently from the stacking unit 40, and the reflecting unit 30 can be fixed to a side wall or the bottom surface of the stacking unit 40.

The receiving unit 20 receives the ultrasonic waves reflected by the reflecting unit 30. As shown in FIG. 2, the receiving unit 20 is arranged such that a receiving surface 20a for receiving the ultrasonic waves is either parallel to the vertical direction (Z-axis direction) or the receiving surface 20a faces downward. Specifically, the receiving unit 20 is arranged such that the receiving surface 20a is inclined by an angle α (α≥0 degree) with respect to the vertical direction but outside of the stacking unit 40.

The receiving unit 20 receives at the receiving surface 20a the ultrasonic waves that are transmitted by the transmitting unit 10 and reflected at a position P4 of the reflecting unit 30 after passing through the position P3 of the through part 41a. Specifically, the receiving unit 20 is arranged such that an angle made by a straight line that joins a center of the circular receiving surface 20a and the position P4 of the reflecting unit 30 with a surface of the reflecting unit 30, and an angle made by a straight line that joins the positions P3 and P4 with the surface of the reflecting unit 30 are equal (angle β shown in FIG. 2).

The orientation of the reflecting unit 30 is adjusted based on the arrangement angle α of the receiving surface 20a so that the ultrasonic waves transmitted from the transmitting unit 10 are incident perpendicularly on the receiving surface 20a. For example, when the transmitting surface 10a of the transmitting unit 10 is parallel to the XY plane and the ultrasonic waves are transmitted downward in the Z-axis direction, and the arrangement angle α of the receiving surface 20a of the receiving unit 20 is 30 degrees, the reflecting unit 30 will be a plane inclined by 30 degrees with respect to the XY plane.

In the banknote detection apparatus, if no banknote 100 has been stacked on the stage 41 of the stacking unit 40, the ultrasonic waves transmitted from the transmitting unit 10 pass through the through part 41a of the stage 41, are reflected by the reflecting unit 30 and received by the receiving unit 20. When the banknote 100 is stacked on the stage 41, at least a part of the through part 41a is blocked by the stacked banknote 100. As a result, at least a part of the ultrasonic waves transmitted from the transmitting unit 10 is blocked by the stacked banknote 100, and ultrasonic waves received by the receiving unit 20 have been attenuated as compared to a case in which there is no stacked banknote. The banknote detection apparatus detects stacking of the banknote 100 on the stage 41 based on the attenuation of the ultrasonic waves.

Some banknotes have a transparent region made of resin and the like. As shown in FIG. 2, when the banknote 100 has a transparent region 100a, light passes through the transparent region 100a. On the other hand, the ultrasonic waves also pass through the transparent region 100a, but the ultrasonic waves are attenuated when passing through the transparent region 100a. Based on this attenuation, the banknote 100 can be detected by the banknote detection apparatus even when a part of the banknote 100 stacked on the stage 41 is transparent.

If dust, trash, and the like is stuck to the transmitting surface 10a and/or the receiving surface 20a, this may cause an adverse effect on the transmission and reception of the ultrasonic waves leading to wrong detection of the banknote 100. Dust and/or trash, such as paper dust produced from the banknote 100 present in the stacking unit 40 falls down in the stacking unit 40 and accumulates on the bottom surface thereof. Also, dust and/or trash entering in the stacking unit 40 from the opening on the front surface of the apparatus falls down in the stacking unit 40 and accumulates on the bottom surface thereof. Therefore, if the receiving unit 20 is arranged on the bottom surface of the stacking unit 40 and facing toward the transmitting unit 10, dust, trash, and the like sticks to the receiving surface 20a leading to wrong detection. However, in the banknote detection apparatus, the transmitting unit 10 is arranged such that the transmitting surface 10a faces downward, and the receiving unit 20 is arranged such that the receiving surface 20a is either parallel to the vertical direction or the receiving surface 20a faces downward. With this configuration, dust, trash, and the like do not easily stick to the transmitting surface 10a and the receiving surface 20a. Accordingly, wrong detection can be prevented and the banknote 100 on the stage 41 can be detected with high precision.

Figure 4A:
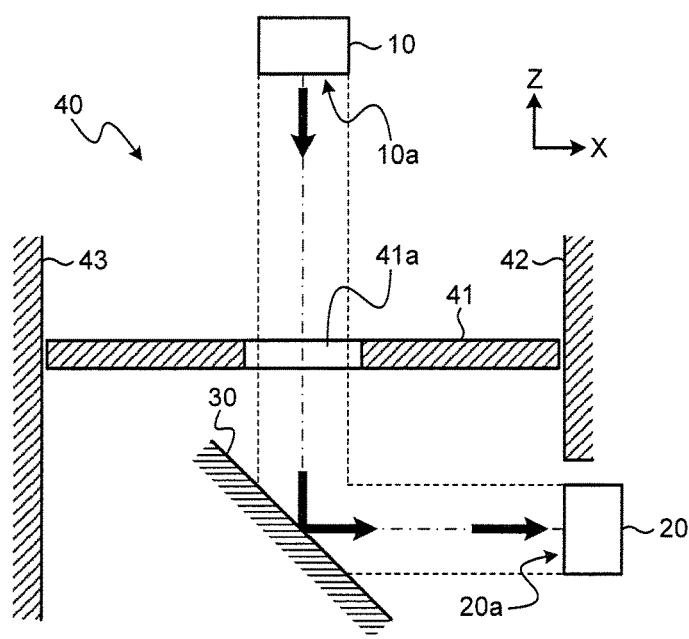
FIGS. 4A and 4B are views of an arrangement example of a transmitting unit and a receiving unit of the banknote detection apparatus.
Figure 4B:
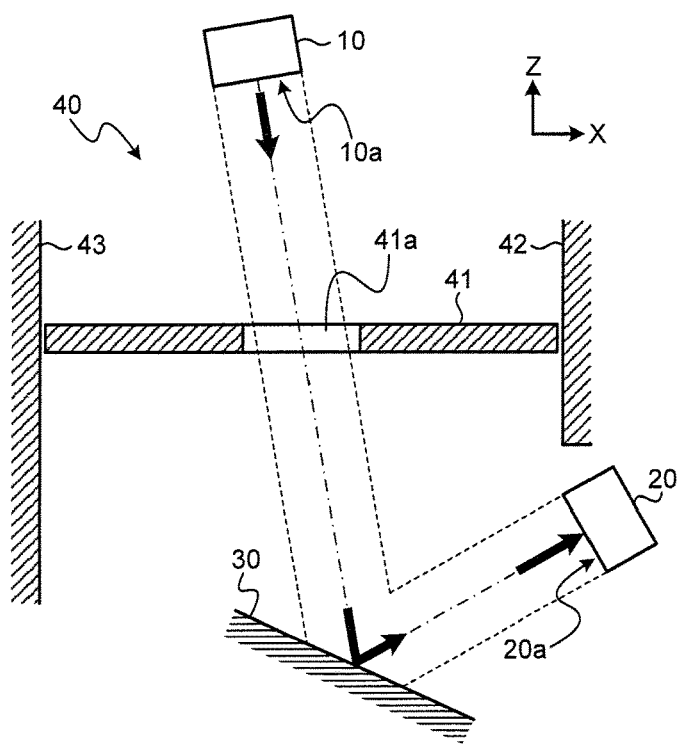

FIGS. 4A and 4B are views of an arrangement example of the transmitting unit 10 and the receiving unit 20 of the banknote detection apparatus. FIG. 4A shows an example in which the receiving unit 20 is arranged below the stage 41 such that the receiving surface 20a is parallel to the YZ plane. Moreover, the transmitting unit 10 is arranged above the stage 41 such that the transmitting surface 10a is parallel to the XY plane and facing downward. The reflecting unit 30 is arranged below the stage 41 and it has a surface that is inclined by 45 degrees with respect to the XY plane so that the ultrasonic waves transmitted from the transmitting surface 10a downward in the Z-axis direction and passed through the through part 41a of the stage 41 travel further in the positive X-axis direction and are received at the receiving surface 20a.

FIG. 4B shows an example in which the receiving unit 20 is arranged below the stage 41 such that the receiving surface 20a is inclined and faces downward. Moreover, the transmitting unit 10 is arranged above the stage 41 such that the transmitting surface 10a is inclined and faces downward. The reflecting unit 30, which is arranged below the stage 41, is arranged by adjusting an arrangement position and angle thereof so that the ultrasonic waves emitted from and perpendicularly to the transmitting surface 10a are perpendicularly incident on the receiving surface 20a after passing through the through part 41a of the stage 41.

As far as it is possible to transmit the ultrasonic waves from the transmitting unit 10 with the transmitting surface 10a facing downward, reflect with the reflecting unit 30 the ultrasonic waves that have passed through the through part 41a of the stage 41, and receive the ultrasonic waves with the receiving unit 20 either with the receiving surface 20a parallel to the vertical direction or with the receiving surface 20a facing downward, the arrangement positions and angles of the transmitting unit 10, the receiving unit 20, and the reflecting unit 30 are not particularly limited.

Figure 5:
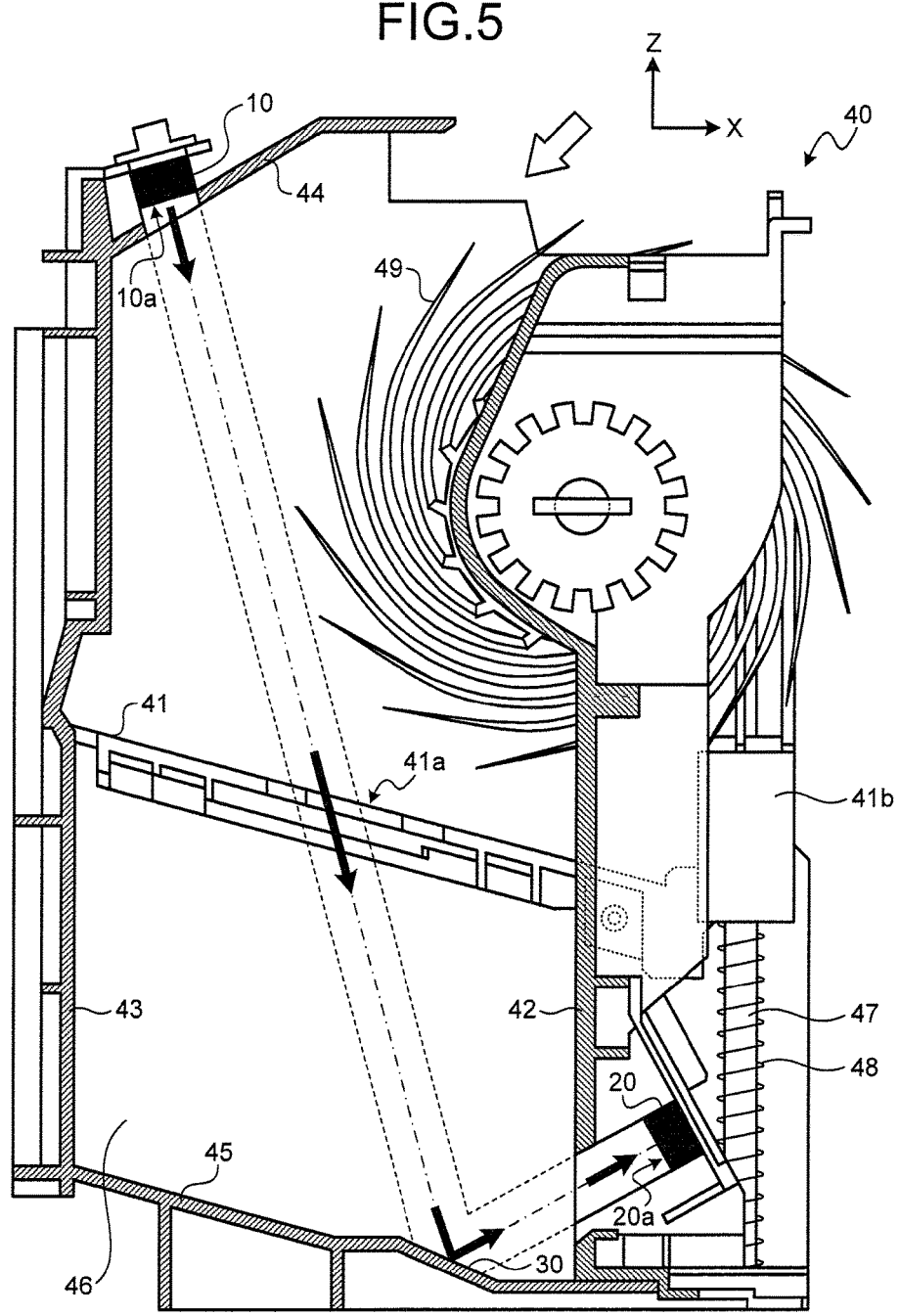
FIG. 5 is a schematic cross-sectional view of an example of the banknote detection apparatus arranged in a stacking unit of the banknote handling apparatus.

FIG. 5 is a schematic cross-sectional view of an example of the banknote detection apparatus arranged in the stacking unit 40 of the banknote handling apparatus 1. The banknote transported by the transport unit 90 is sent, as shown with a hollow arrow, from the top right corner to the inside of the stacking unit 40. The banknote sent in the stacking unit 40 enters between two blades of a stacking wheel 49 rotating in the counterclockwise direction, the banknote is transported in the left direction, and the banknote is stacked on the inclined stage 41 such that the banknote face sits on the stage 41 in a state where the banknote face is parallel to the surface of the stage 41. The stacking unit 40 is constituted by the right wall 42, the left wall 43, an upper wall 44, a base wall 45, and a back wall 46 and has the opening on the front surface side of the apparatus.

A support member 41*b* having a vertical through-hole is formed in a right edge of the stage 41. The support member 41*b* is on the right outer-side of the right wall 42. The stage 41 is supported by a coil spring 48 in a state where a cylindrical slide shaft 47 fixed to the banknote handling apparatus 1 is passed through the coil spring 48 and the through-hole of the support member 41*b*. The coil spring 48 passed through the slide shaft 47 supports the stage 41 such that the stage 41 is held at a predetermined height when no banknote has been stacked on the stage 41. When a banknote is stacked on the stage 41, the stage 41 descends due to the weight of the stacked banknote. When the stacked banknote is removed from the stage 41, the stage 41 returns to its original predetermined height by the action of the coil spring 48.

To allow the banknote stacked on the stage 41 to be easily removed by grasping with fingers from the up-down direction, the cutout portion is formed in the stage 41 by partially cutting a portion from the front surface side to the back surface side as shown in FIG. 3A. This cutout portion constitutes the through part 41*a*.

The transmitting unit 10 of the ultrasonic sensor is fixed on a surface outside of the upper wall 44. The transmitting unit 10 is fixed in an inclined manner with the transmitting surface 10*a* facing downward. The receiving unit 20 is fixed on a surface outside of the right wall 42 in an inclined manner with the receiving surface 20*a* facing downward. A through-hole corresponding to the transmitting surface 10*a* is formed in the upper wall 44, and a through-hole corresponding to the receiving surface 20*a* is formed in the right wall 42. The base wall 45 includes horizontal planes and inclined planes. One of the inclined planes functions as the reflecting unit 30.

The ultrasonic waves transmitted from the transmitting unit 10 when no banknote has been stacked on the stage 41 pass without being changed through the through part 41*a* of the stage 41 and are reflected by the reflecting unit 30. The ultrasonic waves reflected by the reflecting unit 30 are received by the receiving unit 20. In contrast, when the banknote has been stacked on the stage 41, at least a part of the ultrasonic waves transmitted from the transmitting unit 10 is blocked by the stacked banknote that is blocking the through part 41*a* of the stage 41. As a result, attenuated ultrasonic waves are received by the receiving unit 20 as compared to a case in which there is no stacked banknote. The banknote detection apparatus detects the presence or absence of the banknote 100 stacked on the stage 41 based on the attenuation of the ultrasonic waves.

The transmitting unit 10, the reflecting unit 30, and the receiving unit 20 are arranged by adjusting the arrangement positions and angles thereof such that the ultrasonic waves transmitted from the transmitting surface 10*a* and traveling straight are not blocked by any other structural element. For example, the transmitting unit 10, the reflecting unit 30, and the receiving unit 20 are arranged, as shown in FIG. 5, such that the ultrasonic waves pass outside of the stacking wheel 49 in a diameter direction thereof. Specifically, the transmitting unit 10, the reflecting unit 30, and the receiving unit 20 are arranged such that the stacking wheel 49 is located outside a cylindrical region (region shown with a dotted line in FIG. 5) obtained by parallel movement of the circular transmitting surface 10*a* in a direction that is orthogonal to the transmitting surface 10*a*.

In the banknote detection apparatus, instead of using a transmission-type ultrasonic sensor including the transmitting unit 10 and the receiving unit 20, a reflection-type ultrasonic sensor can be used. A banknote detection apparatus including the reflection-type ultrasonic sensor is explained below. Because the configuration of the stacking unit 40 and the stage 41 is the same as the configuration explained by using FIG. 2, only the difference in the configuration when the transmission-type ultrasonic sensor is used is explained below.

Figure 6A:
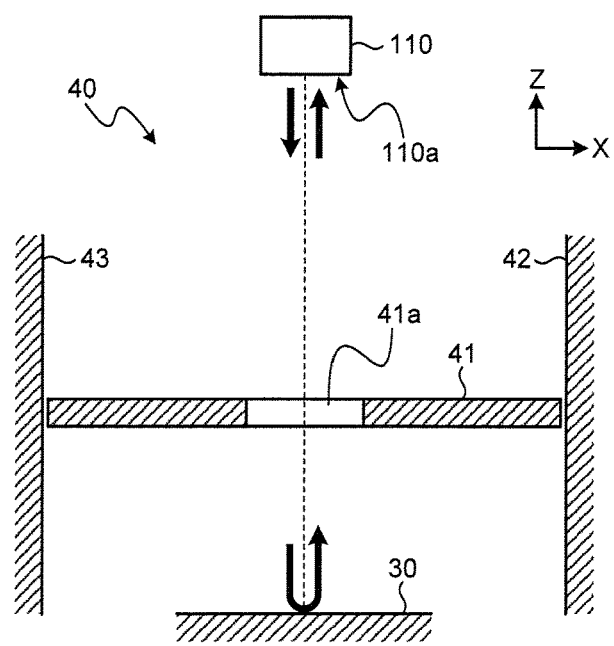
FIGS. 6A and 6B are schematic cross-sectional views of an example of the banknote detection apparatus that uses a reflection-type ultrasonic sensor.
Figure 6B:
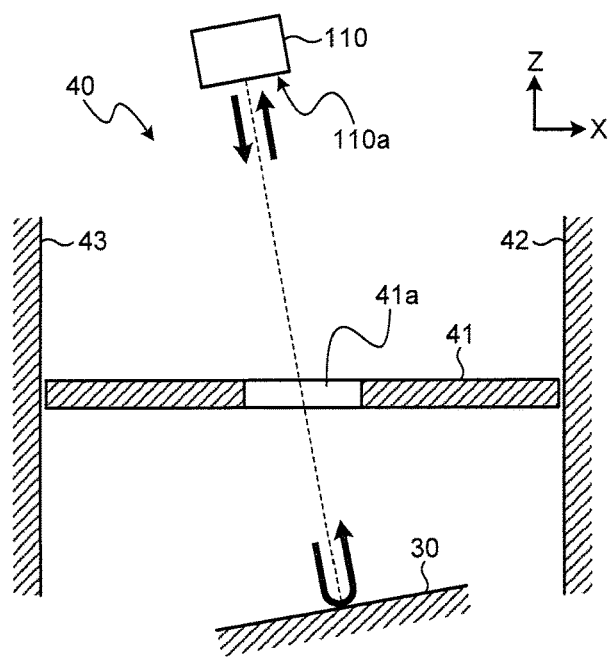

FIGS. 6A and 6B are schematic cross-sectional views of an example of a banknote detection apparatus that uses a reflection-type ultrasonic sensor 110. For example, as shown in FIG. 6A, the banknote detection apparatus includes the reflection-type ultrasonic sensor 110 and the reflecting unit 30 that are arranged facing each other. The reflection-type ultrasonic sensor 110 includes a transmitting unit and a receiving unit. The transmitting unit and the receiving unit are provided integrally in the reflection-type ultrasonic sensor 110. In an alternative configuration, for example, as shown in FIG. 6B, the ultrasonic sensor 110 and the reflecting unit 30, which are facing each other, can be arranged in an inclined manner. As far as it is possible to pass the ultrasonic waves transmitted from the transmitting unit of the ultrasonic sensor 110 through the through part 41*a* of the stage 41, pass the ultrasonic waves reflected by the reflecting unit 30 through the through part 41*a* again, and receive the ultrasonic waves with the receiving unit of the ultrasonic sensor 110, the arrangement positions and angles of the ultrasonic sensor 110 and the reflecting unit 30 are not particularly limited.

Specifically, the ultrasonic sensor 110 is arranged such that a transmitting and receiving surface 110*a* thereof, including a transmitting surface for transmitting the ultrasonic waves from the transmitting unit and a receiving surface for receiving the ultrasonic waves in the receiving unit, faces downward. The ultrasonic sensor 110 transmits the ultrasonic waves downward from the transmitting and receiving surface 110*a*. When no banknote has been stacked on the stage 41, the ultrasonic waves pass through the through part 41*a* of the stage 41 without being changed and are reflected by the reflecting unit 30. The ultrasonic waves reflected by the reflecting unit 30 pass through the through part 41*a* of the stage 41 again and are received by the transmitting and receiving surface 110*a*.

The banknote detection apparatus having such a reflection-type ultrasonic sensor 110 can measure a distance by using the ultrasonic sensor 110. When there is no banknote on the stage 41, the banknote detection apparatus measures a distance from the transmitting and receiving surface 110*a* to the reflecting unit 30 based on a time duration and a speed of the ultrasonic waves. The time duration is from a time point at which the ultrasonic waves are transmitted from the transmitting and receiving surface 110*a* to a time point at which the ultrasonic waves are received in the transmitting and receiving surface 110*a* again after being reflected by the reflecting unit 30.

When the banknote is stacked on the stage 41, at least a part of the ultrasonic waves transmitted from the transmitting and receiving surface 110*a* is reflected from the banknote present on the stage 41. Even if the banknote stacked on the stage 41 has a transparent region, the ultrasonic waves are reflected from this banknote. As a result, the distance from the transmitting and receiving surface 110*a* to the banknote on the stage 41 is measured by the banknote detection apparatus. The measured distance will be shorter when the banknote is stacked on the stage 41 than when there is no banknote on the stage 41. Based on the change in the measured distance between when there is no banknote and when there is a stacked banknote on the stage 41, the banknote detection apparatus detects the banknote stacked on the stage 41.

Because the transmitting and receiving surface 110a faces downward, the ultrasonic sensor 110 is not affected by dust, trash, and the like. Moreover, the through part 41a is provided in the stage 41, and the presence or absence of the banknote on the stage 41 is detected based on a change in the measured distance when the banknote is stacked on the stage 41 by taking the distance from the ultrasonic sensor 110 to a reflecting unit 30 arranged below the stage 41 as a reference distance. When even only one banknote is stacked on the stage 41, the measured distance becomes shorter than the reference distance from the ultrasonic sensor 110 to the top surface of the stage 41. Because the measured distance greatly changes depending on the presence or absence of the banknote, the banknote stacked on the stage 41 can be detected with high precision.

The reflection-type ultrasonic sensor usable in the banknote detection apparatus is not limited to the ultrasonic sensor 110 in which the transmitting unit and the receiving unit are integrated together. As far as it is possible to transmit the ultrasonic waves from the transmitting unit and receive the ultrasonic waves reflected by the reflecting unit 30, as shown in FIGS. 7A and 7B, it is allowable to use a reflection-type ultrasonic sensor 111 in which the transmitting unit 10 and the receiving unit 20 are arranged separately.

Figure 8A:
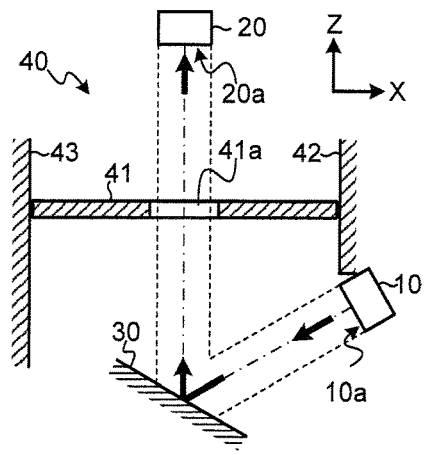
FIGS. 8A, 8B and 8C are cross-sectional views of other arrangement examples of a transmitting unit and a receiving unit of the banknote detection apparatus.
Figure 8B:
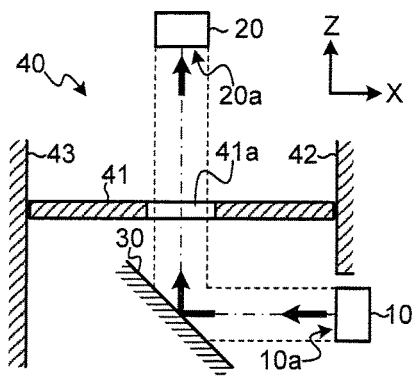
Figure 8C:
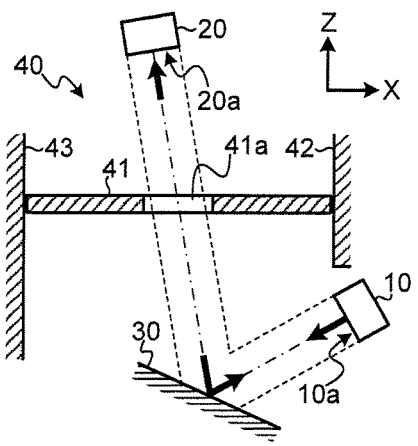

In the present embodiment, the transmitting unit 10 is arranged above the stage 41 and the receiving unit 20 is arranged below the stage 41; however, the arrangement positions of the transmitting unit 10 and the receiving unit 20 can be interchanged. Specifically, as shown in FIGS. 8A to 8C, the receiving unit 20 can be arranged at the position of the transmitting unit 10 and the transmitting unit 10 can be arranged at the position of the receiving unit 20 shown in FIG. 2 and the like.

Figure 9A:
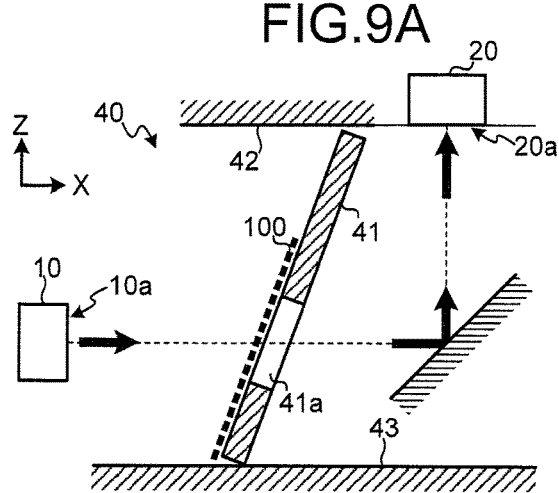
FIGS. 9A, 9B and 9C are cross-sectional views of arrangement examples of a transmitting unit and a receiving unit inside another stacking unit.
Figure 9B:
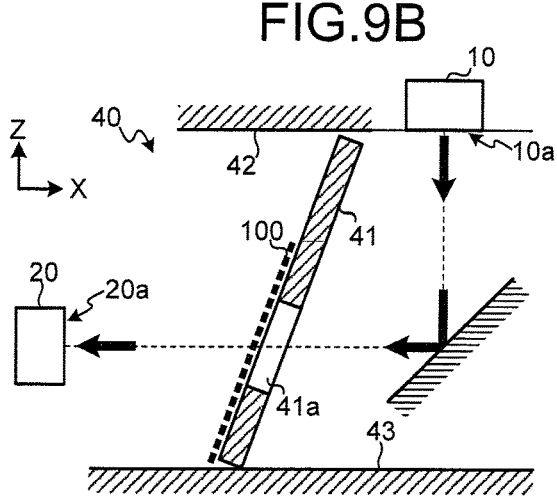
Figure 9C:
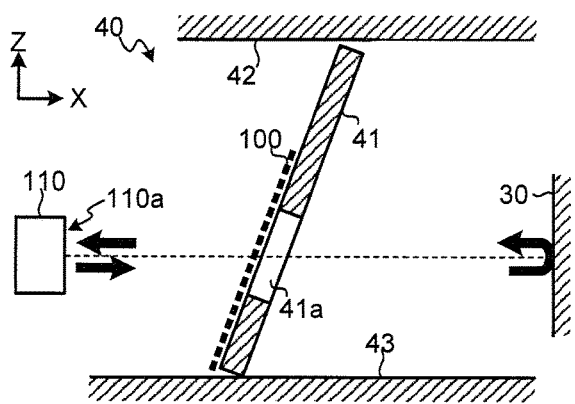

Moreover, an example is explained above in which the banknote face sits on the top surface of the stage 41 when the banknote 100 is stacked; however, for example, a configuration is allowable in which the structure shown in FIG. 2 is rotated counterclockwise around the Y-axis by less than 90 degrees. Specifically, as shown in FIGS. 9A and 9B, even if the stacking unit is configured such that the banknote 100 is stacked therein with the short edge thereof toward the front side of the apparatus and the long edge thereof touching the bottom surface of the stacking unit 40 while the banknote 100 is in a standing state or is in an inclined standing state with the banknote face sitting on one surface of the stage 41, the stacked banknote 100 can be detected by using the above method. The transmitting unit 10 is arranged on one side and the receiving unit 20 is arranged on the other side of the stage 41 with both the transmitting surface 10a and the receiving surface 20a either parallel to the vertical direction or facing downward so that it is possible to transmit and receive the ultrasonic waves between the transmitting unit 10 and the receiving unit 20. Moreover, the through part 41a is provided in the stage 41 so that the ultrasonic waves transmitted and received between the transmitting unit 10 and the receiving unit 20 change depending on the presence or absence of the banknote 100 stacked with the banknote face sitting on the stage 41. By transmitting and receiving the ultrasonic waves between the transmitting unit 10 and the receiving unit 20 through this through part 41a, the presence or absence of the stacked banknote 100 can be detected. Alternatively, in a case where the reflection-type ultrasonic sensor 110 is provided in the stacking unit 40, as shown in FIG. 9C, the presence or absence of a banknote 100 stacked in a standing state or in an inclined standing state with the banknote face sitting on one surface of the stage 41 can be detected.

Figure 10A:
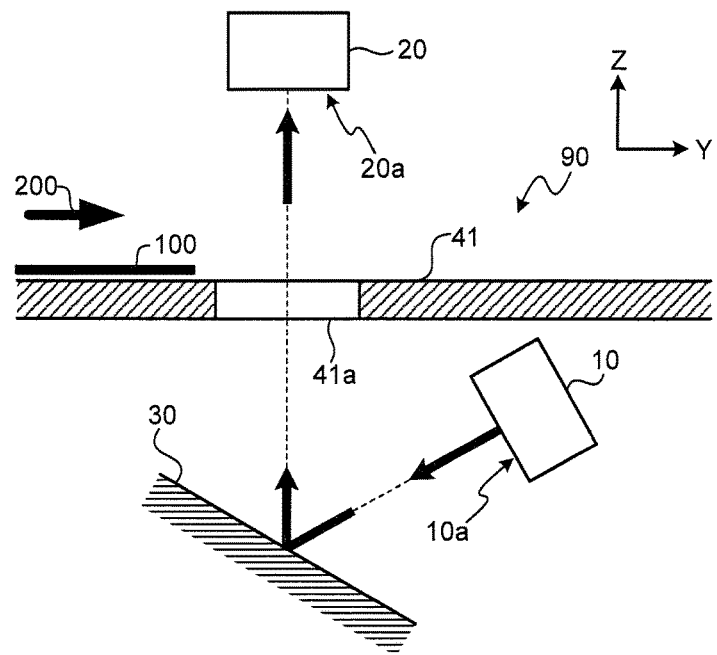
FIGS. 10A and 10B are cross-sectional views for explaining configuration of the banknote detection apparatus provided for detecting a banknote being transported on the transport path.
Figure 10B:
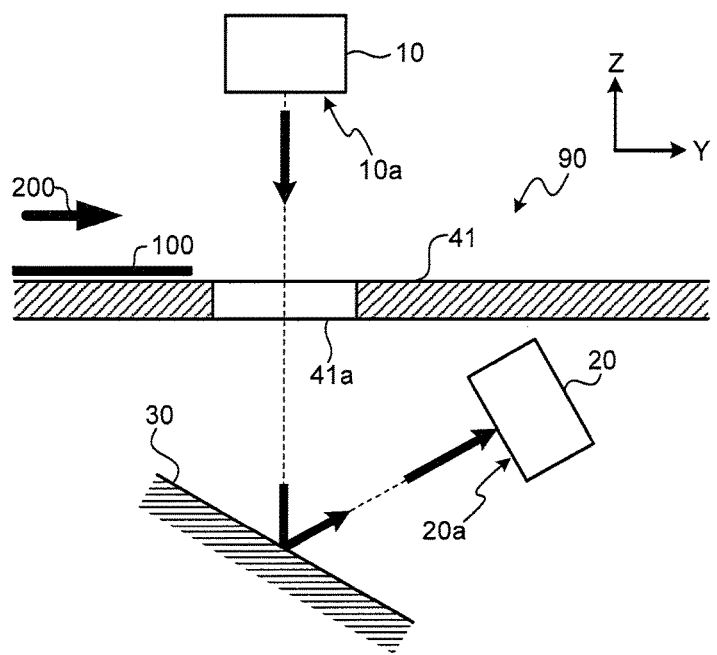
Figure 11:
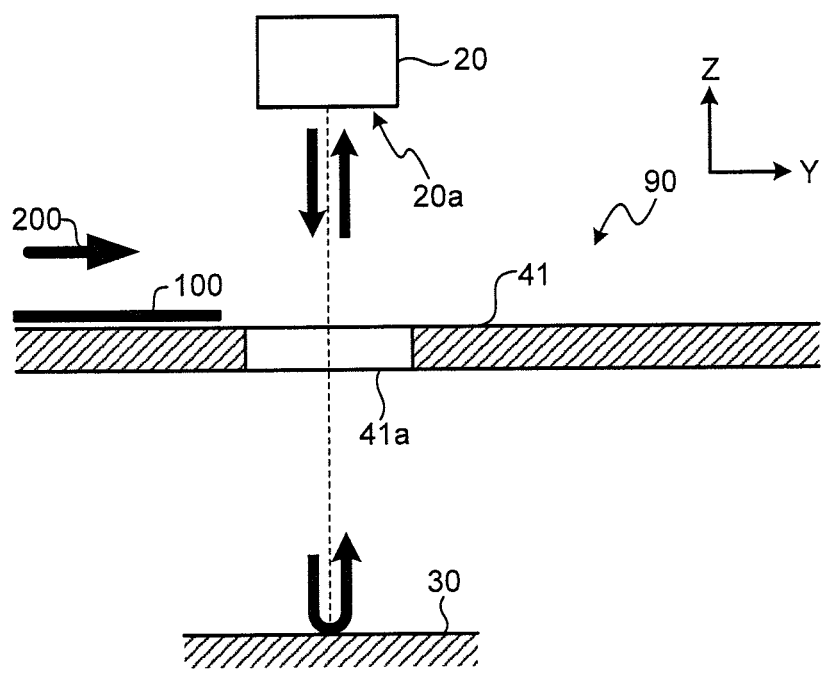
FIG. 11 is a cross-sectional view of another example of the banknote detection apparatus provided for detecting a banknote being transported on the transport path.

Moreover, an example of detecting a banknote in the stacking unit 40 is explained in the present embodiment; however, the above banknote detection apparatus can be used to detect a banknote that is transported on the transport path inside the banknote handling apparatus. Specifically, for example, assume that FIG. 2, FIGS. 4A and 4B, and FIGS. 6A and 6B show schematic cross-sectional views of the transport path when seen from a transport direction (Y-axis direction). Moreover, assume that a member shown with a reference numeral 41 in these drawings represents a support member 41 that supports the banknote 100 on the transport path for transporting the banknote 100 in the Y-axis direction. That is, a top surface of the support member 41 constitutes a transport surface of the transport path for transporting the banknote 100 in the Y-axis direction. In this case, the through part 41a shown in these drawings represents a through-hole formed in the support member 41 at a position corresponding to a detection position of the banknote 100. As mentioned earlier, the banknote 100 that is transported on the transport path and passes the detection position can be detected by arranging the transmitting unit 10, the receiving unit 20, and the reflecting unit 30 corresponding to the through part 41a formed in the support member 41. If there is a requirement to detect the banknote at a plurality of positions on the transport path, a through part can be formed at each of the detection positions, and the transmitting unit 10, the receiving unit 20, and the reflecting unit 30 can be arranged corresponding to each of the through parts. This configuration allows detection of the banknote at the plurality of positions. For example, as shown in FIGS. 10A, 10B and 11, a transport path constituting the transport unit 90 supports a banknote 100 being transported in the direction 200. The bottom part of the transport path functions as the support member 41. The support member 41 is located in the same way as that in the stacking unit 40, such that the support member 41 separates a space above the support member from the other space below the support member 41. As shown in FIGS. 10A and 10B, the transmitting unit 10 is arranged on one side of the transport path and the receiving unit 20 is arranged on the other side of the transport path. The transmitting unit 10 and the receiving unit 20 are shifted in a transport direction of the banknote 100. Alternatively, as shown in FIG. 11, the reflection-type ultrasonic sensor 110 arranged on one side of the transport path can be used with the reflecting unit 30 arranged on the other side of the transport path. In these structures, the banknote 100 can also be detected by using the above method.

Figure 12:
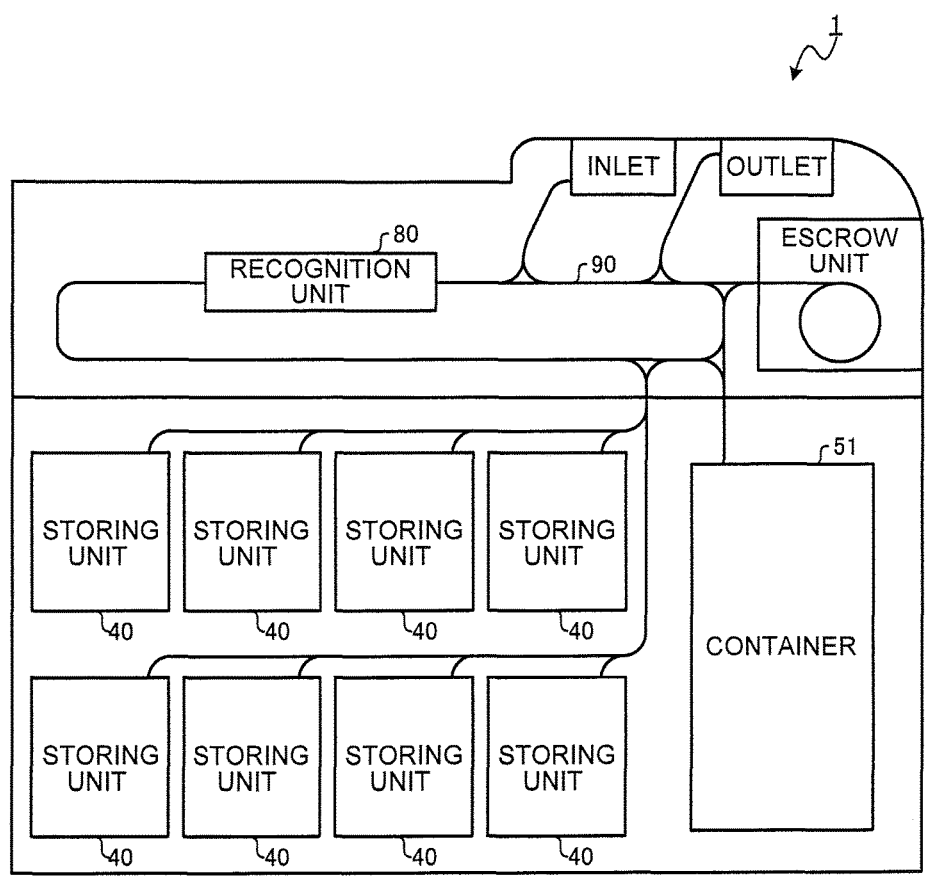
FIG. 12 is a view for explaining another structure of a banknote handling apparatus including a banknote detection apparatus.
Figure 13A:
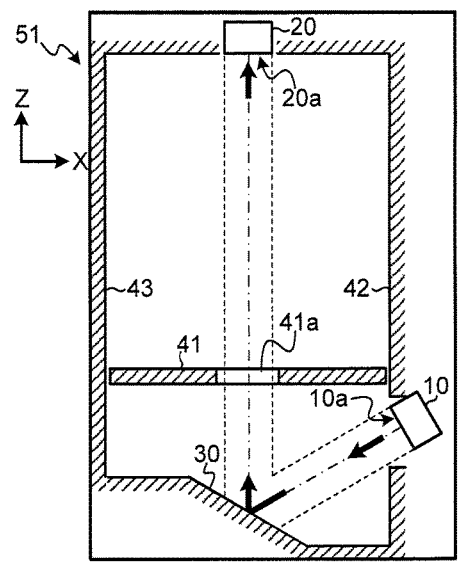
FIGS. 13A, 13B and 13C are cross-sectional views for explaining structure of a banknote container.
Figure 13B:
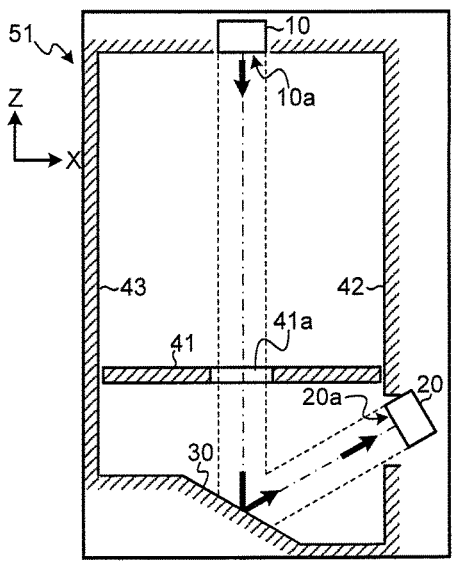
Figure 13C:
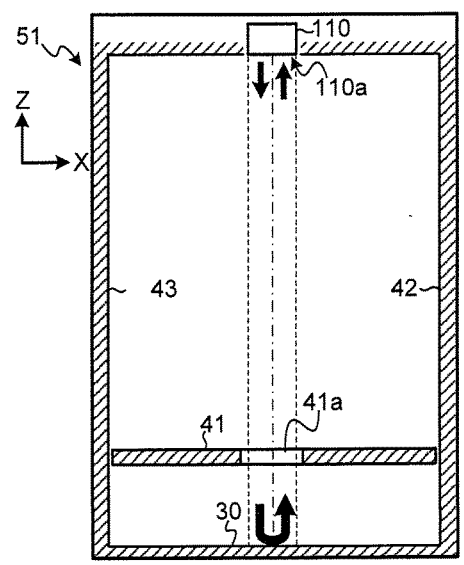

An example is explained in which the banknote handling apparatus 1 includes the stacking unit 40 having the opening for removing stacked banknote therein; however the structure is not limited to this example. For example, as shown in FIG. 12, in the storing unit 40 of the banknote handling apparatus 1, which is one of bank teller machines used in financial institutions such as bank, a banknote stored in the storing unit 40 inside the apparatus can be detected by using the above method. The banknote handling apparatus 1 shown in FIG. 12 includes a container 51 for collecting banknotes from the banknote handling apparatus 1. The container 51 is a cassette-type storing unit detachably attached to the banknote handling apparatus 1. As shown in FIGS. 13A to 13C, the banknote detection apparatus is provided in the container 51, and the banknote stored in the container 51 can be detected by using the above method.

As explained above, with the banknote detection apparatus according to the present embodiment, the presence or absence of the banknote stacked in the stacking unit and/or the presence or absence of the banknote transported on the transport path can be detected by using the ultrasonic waves. When using the transmission-type ultrasonic sensor, for example, the transmitting unit 10 is arranged such that the transmitting surface 10a for transmitting the ultrasonic waves faces downward and the receiving unit 20 is arranged such that the receiving surface 20a is either parallel to the vertical direction or the receiving surface 20a faces downward. With this configuration, dust, trash, and the like do not easily stick to the transmitting surface 10a and the receiving surface 20a. Accordingly, the presence or absence of the banknote stacked in the stacking unit and/or the presence or absence of the banknote transported on the transport path can be detected with high precision.

For example, the ultrasonic waves transmitted from the transmitting unit 10 arranged above the stage 41 of the stacking unit 40 pass through the through part 41a formed in the stage 41, the ultrasonic waves are reflected by the reflecting unit 30 arranged below the stage 41, and the ultrasonic waves are received by the receiving unit 20 arranged below the stage 41. When the through part 41a is blocked by the banknote stacked on the stage 41, at least a part of the ultrasonic waves is blocked whereby attenuated ultrasonic waves are received by the receiving unit 20. The banknote detection apparatus detects the banknote based on the attenuation of the ultrasonic waves. Therefore, even when a part of or the entire banknote stacked on the stage 41 is made of a transparent material through which light can pass, the banknote can be detected. Moreover, the banknote stacked on the stage 41 can be detected in a structure in which the stage 41 is fixed inside the stacking unit 40, or in a structure in which the stage 41 moves in the up-down direction inside the stacking unit 40 depending on the number of the stacked banknotes. Moreover, for example, the banknote can be detected similarly by providing the through part 41a in the support member 41 for supporting the banknote that is transported on the transport path and arranging the banknote detection apparatus corresponding to the through part 41a.

When using the reflection-type ultrasonic sensor 110, the ultrasonic sensor 110 is arranged, with the transmitting and receiving surface 110a facing downward, above the stage 41 that supports the banknote in the stacking unit 40 and/or above the support member 41 that supports the banknote on the transport path. With this configuration, dust, trash, and the like do not easily stick to the transmitting and receiving surface 110a. Accordingly, the presence or absence of the banknote stacked in the stacking unit and/or the presence or absence of the banknote transported on the transport path can be detected with high precision.

For example, the ultrasonic waves transmitted from the transmitting unit of the reflection-type ultrasonic sensor 110 arranged above the stage 41 of the stacking unit 40, pass through the through part 41a formed in the stage 41, the ultrasonic waves are reflected by the reflecting unit 30 arranged below the stage 41, and the ultrasonic waves pass through the through part 41a again and are received by the receiving unit of the ultrasonic sensor 110. When the through part 41a is blocked by the banknote stacked on the stage 41, because at least a part of the ultrasonic waves does not reach the reflecting unit 30, as the part of the ultrasonic waves is reflected from the stacked banknote, a time duration from the transmission of the ultrasonic waves to the reception thereof changes. The banknote detection apparatus detects the banknote based on such a change in the time duration. That is, the banknote is detected by using the fact that the distance from the ultrasonic sensor 110 to the reflection position becomes short. Therefore, even when a part of or the entire banknote stacked on the stage 41 is made of a transparent material through which light can pass, the banknote can be detected. Moreover, the banknote stacked on the stage 41 can be detected in a structure in which the stage 41 is fixed inside the stacking unit 40, or in a structure in which the stage 41 moves in the up-down direction inside the stacking unit 40 depending on the number of the stacked banknotes. Moreover, for example, the banknote can be detected similarly by providing the through part 41a in the support member 41 for supporting the banknote that is transported on the transport path and arranging the banknote detection apparatus corresponding to the through part 41a.

As explained above, a paper sheet detection apparatus according to one aspect of the present invention detects presence or absence of a paper sheet in a storing unit based on a change in ultrasonic waves transmitted toward and received from the storing unit. The paper sheet detection apparatus includes a stage arranged inside the storing unit; a through part formed in the stage; a transmitting unit that has a transmitting surface for transmitting the ultrasonic waves and that is arranged above one side of the stage with the transmitting surface facing downward; a receiving unit that has a receiving surface for receiving the ultrasonic waves and that is arranged on other side of the stage with either the receiving surface parallel to a vertical direction or the receiving surface facing downward; and a reflecting unit that reflects the ultrasonic waves, which were transmitted from the transmitting surface and passed through the through part, toward the receiving surface. The through part is formed at such a position that, when a paper sheet is stored in the storing unit, at least a part of the ultrasonic waves transmitted from the transmitting unit and passing through the through part is blocked by the paper sheet.

A paper sheet detection apparatus according to another aspect of the present invention detects presence or absence of a paper sheet in a storing unit based on a change in ultrasonic waves transmitted toward and received from the storing unit. The paper sheet detection apparatus includes a stage arranged inside the storing unit; a through part formed in the stage; a receiving unit that has a receiving surface for receiving the ultrasonic waves and that is arranged above one side of the stage with the receiving surface facing downward; a transmitting unit that has a transmitting surface for transmitting the ultrasonic waves and that is arranged on other side of the stage with either the transmitting surface parallel to a vertical direction or the transmitting surface facing downward; and a reflecting unit that reflects the ultrasonic waves, which are transmitted from the transmitting surface, so that the ultrasonic waves pass through the through part and reach the receiving surface. The through part is formed at such a position that, when a paper sheet is stored in the storing unit, at least a part of the ultrasonic waves reflected by the reflecting unit and passing through the through part is blocked by the paper sheet.

A paper sheet detection apparatus according to still another aspect of the present invention detects presence or absence of a paper sheet in a storing unit based on a change in ultrasonic waves transmitted toward and received from the storing unit. The paper sheet detection apparatus includes a stage arranged inside the storing unit; a through part formed in the stage; a transmitting unit that has a transmitting surface for transmitting the ultrasonic waves and that is arranged above one side of the stage with the transmitting surface facing downward; a receiving unit that has a receiving surface for receiving the ultrasonic waves and that is arranged with the receiving surface facing downward on the same side on which the transmitting unit is arranged with respect to the stage; and a reflecting unit that reflects the ultrasonic waves, which were transmitted from the transmitting surface and passed through the through part, so that the ultrasonic waves pass again through the through part and reach the receiving unit. The through part is formed at such a position that, when a paper sheet is stored in the storing unit, at least a part of the ultrasonic waves transmitted from the transmitting unit is reflected from the paper sheet.

In the above paper sheet detection apparatus, the transmitting unit, the receiving unit and the reflecting unit are arranged so that the ultrasonic waves transmitted and received between the transmitting unit and the receiving unit pass outside of a stacking wheel, which stacks the paper sheet on the stage, in a diameter direction thereof.

In the above paper sheet detection apparatus, the stage is configured to move depending on number of the paper sheets stacked on the stage.

In the above paper sheet detection apparatus, the through part is a cutout portion formed in the stage for allowing the paper sheets stacked on the stage to be removed by grasping.

In the above paper sheet detection apparatus, the ultrasonic waves transmitted and received between the transmitting unit and the receiving unit pass through the through part in the vertical direction.

In the above paper sheet detection apparatus, the ultrasonic waves transmitted and received between the transmitting unit and the receiving unit pass through the through part along a direction that intersects the vertical direction.

A paper sheet detection apparatus according to still another aspect of the present invention detects presence or absence of a paper sheet based on a change in ultrasonic waves transmitted and received. The paper sheet detection apparatus includes a support member that supports a paper sheet; a through part formed in the support member; a transmitting unit that has a transmitting surface for transmitting the ultrasonic waves and that is arranged above one side of the support member with the transmitting surface facing downward; a receiving unit that has a receiving surface for receiving the ultrasonic waves and that is arranged on other side of the support member with either the receiving surface parallel to a vertical direction or the receiving surface facing downward; and a reflecting unit that reflects the ultrasonic waves, which were transmitted from the transmitting surface and passed through the through part, toward the receiving surface. The through part is formed at such a position that, when a paper sheet is supported by the support member, at least a part of the ultrasonic waves transmitted from the transmitting unit and passing through the through part is blocked by the paper sheet.

A paper sheet detection apparatus according to still another aspect of the present invention detects presence or absence of a paper sheet based on a change in ultrasonic waves transmitted and received. The paper sheet detection apparatus includes a support member that supports a paper sheet; a through part formed in the support member; a receiving unit that has a receiving surface for receiving the ultrasonic waves and that is arranged above one side of the support member with the receiving surface facing downward; a transmitting unit that has a transmitting surface for transmitting the ultrasonic waves and that is arranged on other side of the support member with either the transmitting surface parallel to a vertical direction or the transmitting surface facing downward; and a reflecting unit that reflects the ultrasonic waves, which are transmitted from the transmitting surface, so that the ultrasonic waves pass through the through part and reach the receiving surface. The through part is formed at such a position that, when a paper sheet is supported by the support member, at least a part of the ultrasonic waves reflected by the reflecting unit and passing through the through part is blocked by the paper sheet.

A paper sheet detection apparatus according to still another aspect of the present invention detects presence or absence of a paper sheet based on a change in ultrasonic waves transmitted and received. The paper sheet detection apparatus includes a support member that supports a paper sheet; a through part formed in the support member; a transmitting unit that has a transmitting surface for transmitting the ultrasonic waves and that is arranged above one side of the support member with the transmitting surface facing downward; a receiving unit that has a receiving surface for receiving the ultrasonic waves and that is arranged with the receiving surface facing downward on the same side on which the transmitting unit is arranged with respect to the support member; and a reflecting unit that reflects the ultrasonic waves, which were transmitted from the transmitting surface and passed through the through part, so that the ultrasonic waves pass again through the through part and reach the receiving unit. The through part is formed at such a position that, when a paper sheet is supported by the support member, at least a part of the ultrasonic waves transmitted from the transmitting unit is reflected from the paper sheet.

In the above paper sheet detection apparatus, the support member supports the paper sheet in a transport path for transporting the paper sheet.

In the above paper sheet detection apparatus, the support member supports the paper sheet in a storing unit for storing the paper sheet.

In the above paper sheet detection apparatus, the transmitting unit and the receiving unit that performs transmission and reception of the ultrasonic waves for detecting the paper sheet are arranged such that one of the transmitting surface and the receiving surface faces downward and the other is either parallel to the vertical direction or facing downward. Moreover, the transmitting unit and the receiving unit are arranged such that, by using the reflecting unit, the ultrasonic waves transmitted and received therebetween pass through the through part formed in the support member for supporting the paper sheet such as the stage of the storing unit and a transportation surface of the transport path. In the paper sheet detection apparatus, because the ultrasonic waves received by the receiving unit has changed when the through part is blocked by the paper sheet supported by the support member such as the paper sheet stored in the storing unit and the paper sheet transported on the transport path, the paper sheet can be detected based on that change. Because both the transmitting surface and the receiving surface are parallel to the vertical direction or facing downward, dust, trash, and the like does not easily stick to the transmitting surface and the receiving surface. Accordingly, the paper sheet can be detected with high precision by using the ultrasonic waves.

As explained above, the paper sheet detection apparatus according to the present invention is useful in detecting with high precision a paper sheet stored in a paper sheet storing unit and/or a paper sheet transported on a paper sheet transport path.

Although the invention has been explained with respect to specific embodiments for a complete and clear disclosure, the appended claims are not to be thus limited but are to be construed as embodying all modifications and alternative constructions that may occur to one skilled in the art that fairly fall within the basic teaching of the claims.

What is claimed is:

1. A sheet processing apparatus comprising:
    a transport unit that transports a sheet;
    a storing unit that stores the sheet;
    a first support member that is arranged in the storing unit and supports the sheet, a first through part being formed in the first support member;
    a stacking wheel that sends the sheet from the transport unit into the storing unit, the stacking wheel comprising a protrusion portion, the stacking wheel stacking the sheet on the first support member by using the protrusion portion;
    a first transmitting unit that transmits ultrasonic waves from a first transmitting surface into the storing unit;
    a first reflecting unit that reflects the ultrasonic waves transmitted from the first transmitting unit and passed through the first through part; and
    a first receiving unit that receives on a first receiving surface the ultrasonic waves reflected by the first reflecting unit to detect the sheet stacked on the first support member in the storing unit,
    wherein
    the first receiving surface faces downward, and the first transmitting surface is parallel to a vertical direction or faces downward, or
    the first transmitting surface faces downward, and the first receiving surface is parallel to a vertical direction or faces downward, and
    the stacking wheel is arranged at a position where the ultrasonic waves transmitted and received between the first transmitting unit and the first receiving unit pass outside of the stacking wheel.

2. The sheet processing apparatus as claimed in claim 1, wherein
    one of the first transmitting unit and the first receiving unit is arranged in one space separated by the first support member from the other space and
    the other of the first transmitting unit and the first receiving unit is arranged in the other space.

3. The sheet processing apparatus as claimed in claim 1, wherein both the first transmitting unit and the first receiving unit are arranged in one space separated by the first support member from the other space inside the storing unit.

4. The sheet processing apparatus as claimed in claim 3, wherein the first transmitting unit and the first receiving unit are formed integrally.

5. The sheet processing apparatus as claimed in claim 1, wherein
    the storing unit is a stacker formed integrally with the sheet processing apparatus, or
    the storing unit is a container detachably attached to the sheet processing apparatus.

6. The sheet processing apparatus as claimed in claim 1, wherein the first support member is configured to move depending on the number of sheets stacked on the first support member.

7. The sheet processing apparatus as claimed in claim 1, wherein the first through part is a cutout portion formed in the first support member.

8. The sheet processing apparatus as claimed in claim 1, further comprising
    a second support member that supports the sheet being transported, the second support member being included in the transport unit, a second through part being formed in the second support member;
    a second transmitting unit that transmits ultrasonic waves from a second transmitting surface;
    a second reflecting unit that reflects the ultrasonic waves transmitted from the second transmitting unit and passed through the second through part; and
    a second receiving unit that receives on a second receiving surface the ultrasonic waves reflected by the second reflecting unit,
    wherein
    the second receiving surface faces downward, and the second transmitting surface is parallel to a vertical direction or faces downward, or
    the second transmitting surface faces downward, and the second receiving surface is parallel to a vertical direction or faces downward.

9. The sheet processing apparatus as claimed in claim 8, wherein
    one of the second transmitting unit and the second receiving unit is arranged in one space separated by the second support member from the other space and
    the other of the second transmitting unit and the second receiving unit is arranged in the other space.

10. The sheet processing apparatus as claimed in claim 8, wherein both the second transmitting unit and the second receiving unit are arranged in one space separated by the second support member from the other space.

11. The sheet processing apparatus as claimed in claim 10, wherein the second transmitting unit and the second receiving unit are formed integrally.

12. The sheet processing apparatus as claimed in claim 1, wherein the ultrasonic waves pass through the first through part in the vertical direction.

13. The sheet processing apparatus as claimed in claim 1, wherein the ultrasonic waves pass through the first through part in a direction inclined at a predetermined angle with regard to the vertical direction.

* * * * *